United States Patent
Asano et al.

(10) Patent No.: US 10,443,484 B2
(45) Date of Patent: Oct. 15, 2019

(54) INTAKE AIR COOLING DEVICE

(71) Applicant: DENSO CORPORATION, Kariya, Aichi-pref. (JP)

(72) Inventors: Taichi Asano, Kariya (JP); Takashi Yasuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 302 days.

(21) Appl. No.: 15/313,614

(22) PCT Filed: Jun. 9, 2015

(86) PCT No.: PCT/JP2015/002877
§ 371 (c)(1),
(2) Date: Nov. 23, 2016

(87) PCT Pub. No.: WO2015/194125
PCT Pub. Date: Dec. 23, 2015

(65) Prior Publication Data
US 2017/0204780 A1 Jul. 20, 2017

(30) Foreign Application Priority Data
Jun. 16, 2014 (JP) .................................. 2014-123060

(51) Int. Cl.
*F02B 29/04* (2006.01)
*F01P 3/20* (2006.01)
(Continued)

(52) U.S. Cl.
CPC ...... *F02B 29/0443* (2013.01); *F02B 29/0462* (2013.01); *F01P 3/20* (2013.01);
(Continued)

(58) Field of Classification Search
CPC ...... F01P 3/04; F01P 7/162; F01P 7/16; F01P 2007/146; F01P 2007/168; F01P 9/04;
(Continued)

(56) References Cited

U.S. PATENT DOCUMENTS 4,977,743 A 12/1990 Aihara et al.
6,571,765 B2 * 6/2003 Kuboshima ......... F02D 41/0065
123/564

(Continued)

FOREIGN PATENT DOCUMENTS

EP 2375035 A1 10/2011
JP H01177414 A 7/1989
(Continued)

*Primary Examiner* — Thai Ba Trieu
*Assistant Examiner* — Edward Bushard
(74) *Attorney, Agent, or Firm* — Harness, Dickey & Pierce, P.L.C.

(57) ABSTRACT

In an intake air cooling device, a heat-exchanging core portion in an intercooler has an intake-air downstream-side core portion and an intake-air upstream-side core portion located upstream of the intake-air downstream-side core portion in a flow of intake air. The intake-air downstream-side core portion is located upstream of the intake-air upstream-side core portion in a flow of a cooling fluid. The intercooler has a U-turn portion at which a flow direction of the cooling fluid turns around between the intake-air downstream-side core portion and the intake-air upstream-side core portion. A flow rate control device intermittently supplies the intercooler with a predetermined volume of the cooling fluid at a time. The predetermined volume is a value determined on basis of a volumetric capacity of a cooling fluid channel in the intake-air downstream-side core portion.

10 Claims, 8 Drawing Sheets

(51) Int. Cl.
  *F01P 5/10*   (2006.01)
  *F01P 7/14*   (2006.01)
(52) U.S. Cl.
  CPC . *F01P 5/10* (2013.01); *F01P 7/14* (2013.01); *F01P 2060/02* (2013.01); *Y02T 10/146* (2013.01)
(58) Field of Classification Search
  CPC ... F01P 7/167; F02B 29/0443; F02B 29/0412; F02B 29/0406
  See application file for complete search history.

(56) References Cited

U.S. PATENT DOCUMENTS

| | | | |
|---|---|---|---|
| 6,808,015 B2* | 10/2004 | Osakabe | F28D 15/0233 165/104.21 |
| 6,826,903 B2* | 12/2004 | Yahata | F02D 41/021 60/605.2 |
| 10,060,338 B2* | 8/2018 | Harada | F02B 29/0462 |
| 2001/0042614 A1* | 11/2001 | Okamoto | F28D 15/0266 165/104.21 |
| 2007/0261682 A1 | 11/2007 | Smith | |
| 2008/0115528 A1* | 5/2008 | Yamamoto | B60H 1/3227 62/513 |

FOREIGN PATENT DOCUMENTS

| | | | |
|---|---|---|---|
| JP | 2011190742 A | 9/2011 | |
| JP | 2011190744 A | 9/2011 | |
| JP | 2011214544 A | 10/2011 | |
| JP | 2013104314 A | 5/2013 | |

* cited by examiner

INTAKE AIR COOLING DEVICE

CROSS REFERENCE TO RELATED APPLICATIONS

This application is a U.S. National Phase Application under 35 U.S.C. 371 of International Application No. PCT/JP2015/002877 filed on Jun. 9, 2015 and published in Japanese as WO 2015/194125 A1 on Dec. 23, 2015. This application is based on and claims the benefit of priority from Japanese Patent Application No. 2014-123060 filed on Jun. 16, 2014. The entire disclosures of all of the above applications are incorporated herein by reference.

TECHNICAL FIELD

The present disclosure relates to an intake air cooling device that cools intake air of an engine.

BACKGROUND ART

A vehicle featuring a downsized, supercharged engine (hereinafter, referred to as a downsized, supercharged vehicle) enhances fuel efficiency by adopting a small displacement turbocharged engine and is in widespread use recently. The downsized, supercharged vehicle preferably uses a water-cooled intercooler to cool supercharged air. The water-cooled intercooler is preferable because a capacity of an inlet system can be smaller than in a case where an air-cooled intercooler is used and therefore an engine response can be better.

Patent Document 1 describes a configuration in which coolant water supplied from a turbocharger cooling system flows through a water-cooled intercooler. The turbocharger cooling system is an independent water-cooled cooling system provided separately from an engine cooling system.

In the turbocharger cooling system, coolant water is supplied to the water-cooled intercooler as the coolant water is circulated by a water pump. Driving of the water pump is controlled according to an engine operation state depending on an engine speed, an engine water temperature, an intake air temperature, and so on.

In the related art, when intake air is cooled to or below a dew-point temperature in the water-cooled intercooler, condensed water is generated from the intake air and the condensed water is drawn into an engine with the intake air. When a large amount of condensed air is drawn into the engine, an adverse effect given to an engine operation may possibly cause an engine misfire or the like and also corrosion may develop in the intercooler.

PRIOR ART DOCUMENT

Patent Document

Patent Document 1: JP H01-177414 A

SUMMARY

In view of the foregoing points, an object of the present disclosure is to restrict generation of condensed water from intake air.

An intake air cooling device includes: a pump drawing a cooling fluid into itself and discharging the cooling fluid; an intake air cooling heat exchanger including a heat-exchanging core portion to cool intake air into an engine by heat exchange between the intake air and the cooling fluid; a radiator cooling the cooling fluid by heat exchange between the cooling fluid and outside air; and a flow rate control device controlling a flow rate of the cooling fluid supplied to the intake air cooling heat exchanger. The heat-exchanging core portion includes an intake-air downstream-side core portion and an intake-air upstream-side core portion located upstream of the intake-air downstream-side core portion in a flow of the intake air. Each of the intake-air downstream-side core portion and the intake-air upstream-side core portion internally includes a cooling fluid channel where the cooling fluid flows. The intake-air downstream-side core portion is located upstream of the intake-air upstream-side core portion in a flow of the cooling fluid. The intake air cooling heat exchanger includes a U-turn portion at which a flow direction of the cooling fluid turns around between the intake-air downstream-side core portion and the intake-air upstream-side core portion. The flow rate control device intermittently supplies the intake air cooling heat exchanger with a predetermined volume of the cooling fluid at a time. The predetermined volume is a value determined on basis of a volumetric capacity of the cooling fluid channel in the intake-air downstream-side core portion.

According to the configuration as above, an inconvenience caused when an accumulated flow amount of the cooling fluid supplied to the intake air cooling heat exchanger is too large for the volumetric capacity of the cooling fluid channel in the intake-air downstream-side core portion, that is, an inconvenience that the intake-air downstream-side core portion is cooled more than necessary can be restricted. In addition, an inconvenience caused when an accumulated flow amount of the cooling fluid supplied to the intake air cooling heat exchanger is too small for the volumetric capacity of the cooling fluid channel in the intake-air downstream-side core portion, that is, an inconvenience that a temperature distribution develops in the intake-air downstream-side core portion can be restricted. Hence, generation of condensed water from the intake air can be restricted (see FIG. 8 described below).

To be more specific, the predetermined volume may be from 50% to 150% of the volumetric capacity of the cooling fluid channel in the intake-air downstream-side core portion. In such a case, generation of condensed water from the intake air can be restricted in a reliable manner.

The flow rate control device may start a supply of the cooling fluid to the intake air cooling heat exchanger when a temperature of the intake air after passing through the intake air cooling heat exchanger rises above a threshold. The flow rate control device may stop the supply of the cooling fluid to the intake air cooling heat exchanger when an accumulated flow amount of the cooling fluid supplied to the intake air cooling heat exchanger reaches the predetermined volume.

DESCRIPTION OF EMBODIMENTS

Figure 1:
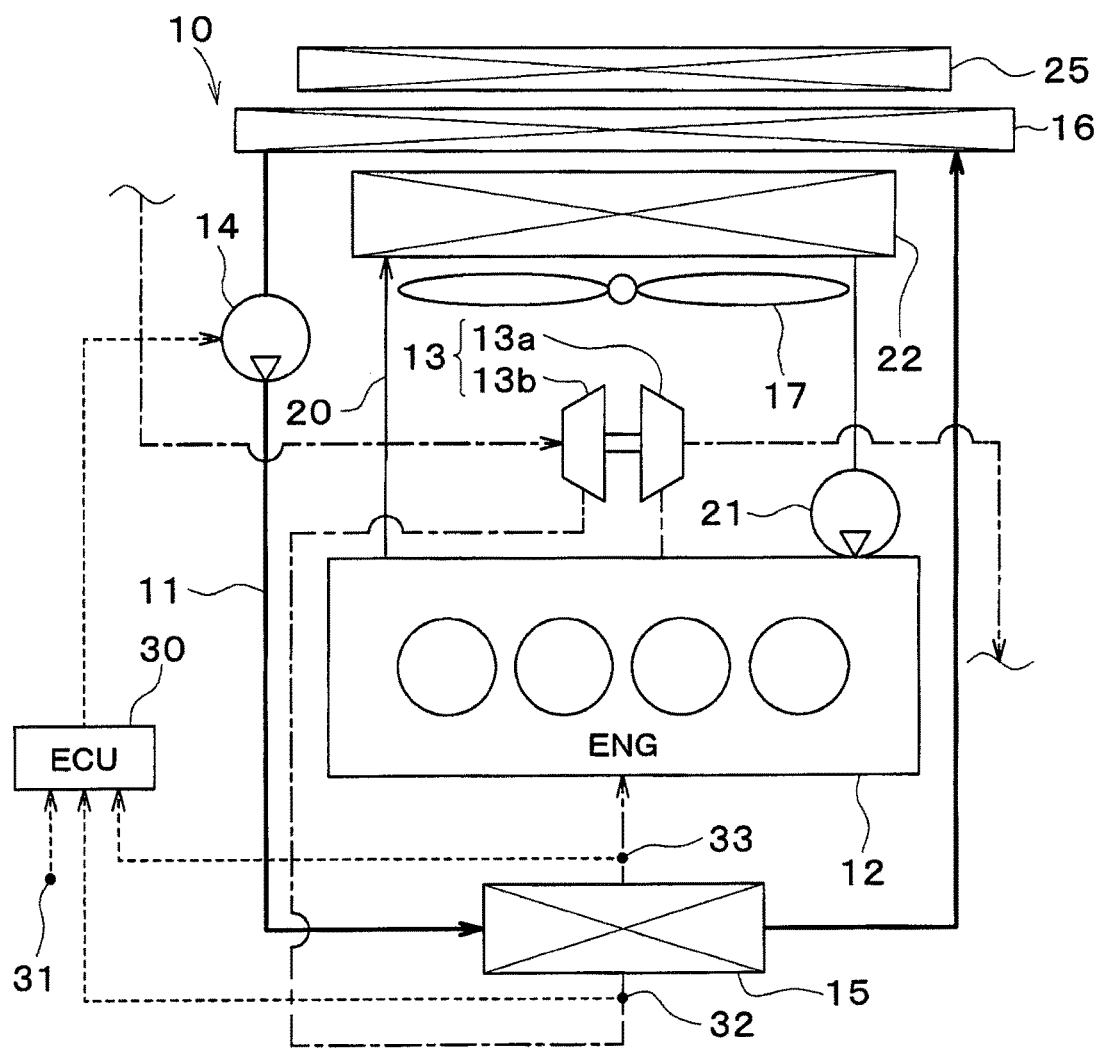
FIG. 1 is a schematic diagram of an intake air cooling device according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An intake air cooling device 10 is shown in FIG. 1. The intake air cooling device 10 is disposed in a vehicle engine room (not shown) and has a coolant water circuit 11. The coolant water circuit 11 is a circuit in which coolant water (cooling fluid) to cool intake air into an engine 12 is circulated. Thick solid arrows of FIG. 1 indicate a flow of the coolant water. The engine 12 is an internal combustion engine generating running power of the vehicle.

In the present embodiment, the coolant water is an antifreeze liquid called an LLC (Long Life Coolant) based on ethylene glycol. Air (intake air) drawn into the engine 12 is supercharged by a supercharger 13.

The supercharger 13 is a turbocharger having a turbine 13a and a compressor 13b. The turbine 13a is disposed in an exhaust passage where an exhaust from the engine 12 flows. The compressor 13b is disposed in an intake air passage where intake air into the engine 12 flows.

Alternate long and short dash arrows of FIG. 1 indicate flows of intake air into the engine 12 and an exhaust from the engine 12. The turbine 13a is driven by an exhaust from the engine 12. The compressor 13b is interlocked with the turbine 13a so as to rotate together. When the turbine 13a is driven by an exhaust from the engine 12, the compressor 13b interlocked with the turbine 13a is driven together and a pressure of the intake air is increased.

The coolant water circuit 11 includes a pump 14, an intercooler 15, and a radiator 16 sequentially disposed in order of being mentioned.

The pump 14 is a fluid machine which draws the coolant water into itself and forces the coolant water out. The pump 14 is an electric pump driven by an electric motor.

The intercooler 15 is an intake air cooling heat exchanger which cools supercharged intake air by letting supercharged intake air that is compressed in the supercharger 13 and becomes hot exchange heat with the coolant water. In order to minimize a capacity of an inlet system, the intercooler 15 is disposed next to the engine 12.

The intercooler 15 is formed as a tank-and-tube heat exchanger. The intercooler 15 has multiple tubes where the coolant water flows and a tank from which the coolant water is distributed to the multiple tubes and in which the coolant water is collected from the multiple tubes.

Alternatively, the intercooler 15 may be formed as a plate-stacked heat exchanger. The plate-stacked heat exchanger is a heat exchanger formed by stacking multiple heat-exchanger plates of substantially a flat plate shape at intervals so as to form heat-exchanging fluid channels among the heat-exchanger plates.

Coolant water channels (cooling fluid channel) where the coolant water flows are provided inside the tubes. Intake air channels where the intake air flows are provided among the tubes adjacent to one another. Heat is exchanged between the coolant water flowing inside the tubes and the intake air flowing through spaces among the tubes adjacent to one another.

A fin to promote heat exchange between the coolant water and the intake air is disposed between every two adjacent tubes. The multiple tubes and the multiple fins form a heat-exchanging core portion in which heat is exchanged between the coolant water and the intake air.

The radiator 16 is a coolant-water cooling heat exchanger which cools the coolant water by letting the coolant water in the coolant water circuit 11 exchange heat with outside air. In other words, the radiator 16 is a heat radiator which dissipates heat carried by the coolant water to outside air. Outside air is blown to the radiator 16 by an outside air blower 17. The outside air blower 17 has an electric fan.

An engine cooling circuit 20 is a circuit in which engine coolant water is circulated. A thin solid arrow of FIG. 1 indicates a flow of the engine coolant water. The engine cooling circuit 20 is an independent circuit provided separately from the coolant water circuit 11. A coolant water channel where the engine coolant water flows is provided inside the engine 12. In the present embodiment, the engine coolant water is an antifreeze liquid called an LLC based on ethylene glycol.

The engine cooling circuit 20 includes an engine cooling pump 21 and an engine cooling radiator 22. The engine cooling pump 21 is a fluid machine which draws the engine coolant water into itself and forces the engine coolant water out. The engine cooling pump 21 is an engine-driven pump driven to rotate by the engine 12. Alternatively, the engine cooling pump 21 may be an electric pump driven by an electric motor.

The engine cooling radiator 22 is a heat exchanger which cools the engine coolant water by letting the engine coolant water exchange heat with outside air. Outside air is blown to the engine cooling radiator 22 by the outside air blower 17.

The radiator 16, the engine cooling radiator 22, and the outside air blower 17 are disposed in a vehicle forefront portion (not shown) with a condenser 25. The condenser 25 is a heat exchanger which cools and condenses a high-pressure-side refrigerant in a refrigeration cycle forming a vehicle air-conditioning device by letting the high-pressure-side refrigerant exchange heat with outside air.

A control device 30 is formed of a known microcomputer having a CPU, a ROM, a RAM, and so on and peripheral circuits. The control device 30 controls operations of various controlled devices connected to an output side by performing various computations according to control programs pre-stored in the ROM. Broken arrows of FIG. 1 represent various signals inputted to and outputted from the control device 30.

The pump 14, the outside air blower 17, and so on are connected to the output side of the control device 30. The control device 30 integrally includes control portions (hardware and software) controlling various controlled devices connected to the output side. The respective control portions controlling the corresponding controlled devices may be provided separately from the control device 30.

Detection signals from a sensor group including an engine speed sensor 31, an intercooler inlet-side intake air temperature sensor 32, an intercooler outlet-side intake air temperature sensor 33, and so on are inputted into an input side of the control device 30. The engine speed sensor 31 is an engine speed detector which detects a speed of the engine 12.

The intercooler inlet-side intake air temperature sensor 32 is an intercooler inlet-side intake air temperature detector which detects an intake air temperature Tg1 (hereinafter, referred to as the intercooler inlet-side intake air temperature) on an intake air inlet side of the intercooler 15. In short, the intercooler inlet-side intake air temperature sensor 32 detects the temperature Tg1 of the intake air before being cooled in the intercooler 15.

The intercooler outlet-side intake air temperature sensor 33 is an intercooler outlet-side intake air temperature detector which detects an intake air temperature Tg2 (hereinafter, referred to as the intercooler outlet-side intake air temperature) on an intake air outlet side of the intercooler 15. In short, the intercooler outlet-side intake air temperature sensor 33 detects the temperature Tg2 of the intake air after being cooled in the intercooler 15.

The control device 30 may estimate the temperature Tg2 of the intake air after being cooled in the intercooler 15 by a computation. For example, the control device 30 may estimate the temperature Tg2 of the intake air after being cooled in the intercooler 15 by performing a computation on the basis of a pressure of the intake air detected by an intercooler outlet-side intake air pressure sensor. The intercooler outlet-side intake air pressure sensor is an intercooler outlet-side intake air pressure detector which detects a pressure of the intake air after being cooled in the intercooler 15.

The temperature Tg2 of the intake air after being cooled in the intercooler 15 has a correlation with a pressure of the intake air after being cooled in the intercooler 15. Hence, by preliminarily storing a control map representing the correlation into the control device 30, the temperature Tg2 of the intake air after being cooled in the intercooler 15 can be estimated by a computation performed on the basis of a pressure of the intake air detected by the intercooler outlet-side intake air pressure sensor and the control map.

The control device 30 may estimate the temperature Tg1 of the intake air before being cooled in the intercooler 15 by a computation. For example, the control device 30 may estimate the temperature Tg1 of the intake air before being cooled in the intercooler 15 by performing a computation on the basis of an outside air temperature detected by an outside air temperature sensor and a pressure of the intake air detected by the intercooler outlet-side intake air pressure sensor.

The outside air temperature sensor is an outside air temperature detector which detects an outside air temperature. A pressure of the intake air detected by the intercooler outlet-side intake air pressure sensor is equal or nearly equal to a pressure of the intake air after being compressed by the compressor 13b of the supercharger 13.

A temperature of the intake air before being cooled in the intercooler 15 is equal or nearly equal to a temperature of the intake air after being compressed by the compressor 13b of the supercharger 13. An outside air temperature is equal or nearly equal to a temperature of the intake air before being compressed by the compressor 13b of the supercharger 13.

A difference between the temperature Tg1 of the intake air before being cooled in the intercooler 15 and an outside air temperature becomes larger as a pressure of the intake air after being cooled in the intercooler 15 becomes higher. The difference becomes larger because a difference between a temperature of the intake air after being compressed by the compressor 13b of the supercharger 13 and a temperature of the intake air before being compressed by the compressor 13b of the supercharger 13 becomes larger as a pressure of the intake air compressed by the compressor 13b of the supercharger 13 becomes higher.

Accordingly, the temperature Tg1 of the intake air before being cooled in the intercooler 15 has a correlation with a pressure of the intake air after being cooled in the intercooler 15 and an outside air temperature. Hence, by preliminarily storing a control map representing the correlation into the control device 30, the temperature Tg2 of the intake air after being cooled in the intercooler 15 can be estimated by a computation performed on the basis of a pressure of the intake air detected by the intercooler outlet-side intake air pressure sensor and the control map.

Figure 2:
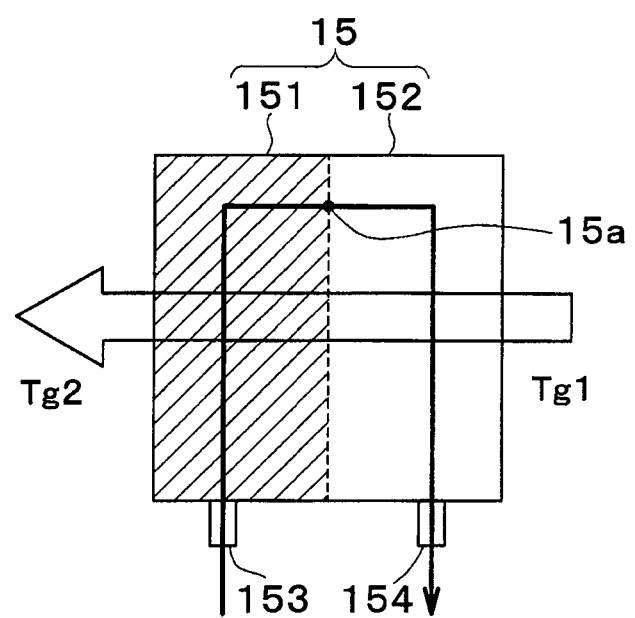
FIG. 2 is a schematic diagram of an intercooler of the first embodiment.

FIG. 2 schematically shows heat-exchanging core portions 151 and 152 in the intercooler 15. A blank arrow of FIG. 2 indicates a flow of the intake air. A solid arrow of FIG. 2 indicates a flow of the coolant water.

The heat-exchanging core portions 151 and 152 have an intake-air downstream-side core portion 151 and an intake-air upstream-side core portion 152, respectively. The intake-air downstream-side core portion 151 is a portion of the heat-exchanging core portions on a downstream side in a flow of the intake air. The intake-air upstream-side core portion 152 is a portion of the heat-exchanging core portions on an upstream side in a flow of the intake air. That is to say, the intake-air upstream-side core portion 152 is located upstream of the intake-air downstream-side core portion 151 in a flow of the intake air.

The intake-air upstream-side core portion 152 is located downstream of the intake-air downstream-side core portion 151 in a flow of the coolant water. In other words, the intake-air downstream-side core portion 151 is located closer to a coolant water inlet 153 of the intercooler 15 and the intake-air upstream-side core portion 152 is located closer to a coolant water outlet 154 of the intercooler 15.

A U-turn portion 15a at which a flow direction of the coolant water turns around is provided between the intake-air downstream-side core portion 151 and the intake-air upstream-side core portion 152. That is to say, a flow of the coolant water takes a turn at the U-turn portion 15a to let the coolant water flow in directions opposite to each other in the intake-air downstream-side core portion 151 and the intake-air upstream-side core portion 152.

Although it is not shown in the drawing, the U-turn portion 15a is provided inside the tank of the intercooler 15 in practice. The coolant water from a tube group in the intake-air downstream-side core portion 151 is collected into the tank in which the U-turn portion 15a is provided, and the coolant water thus collected in the tank is distributed to the tubes in the intake-air upstream-side core portion 152.

The intake-air downstream-side core portion 151 and the intake-air upstream-side core portion 152 have volumetric capacities of the tubes (volumetric capacities of channels where the coolant water flows) equal or nearly equal to each other.

Figure 3:
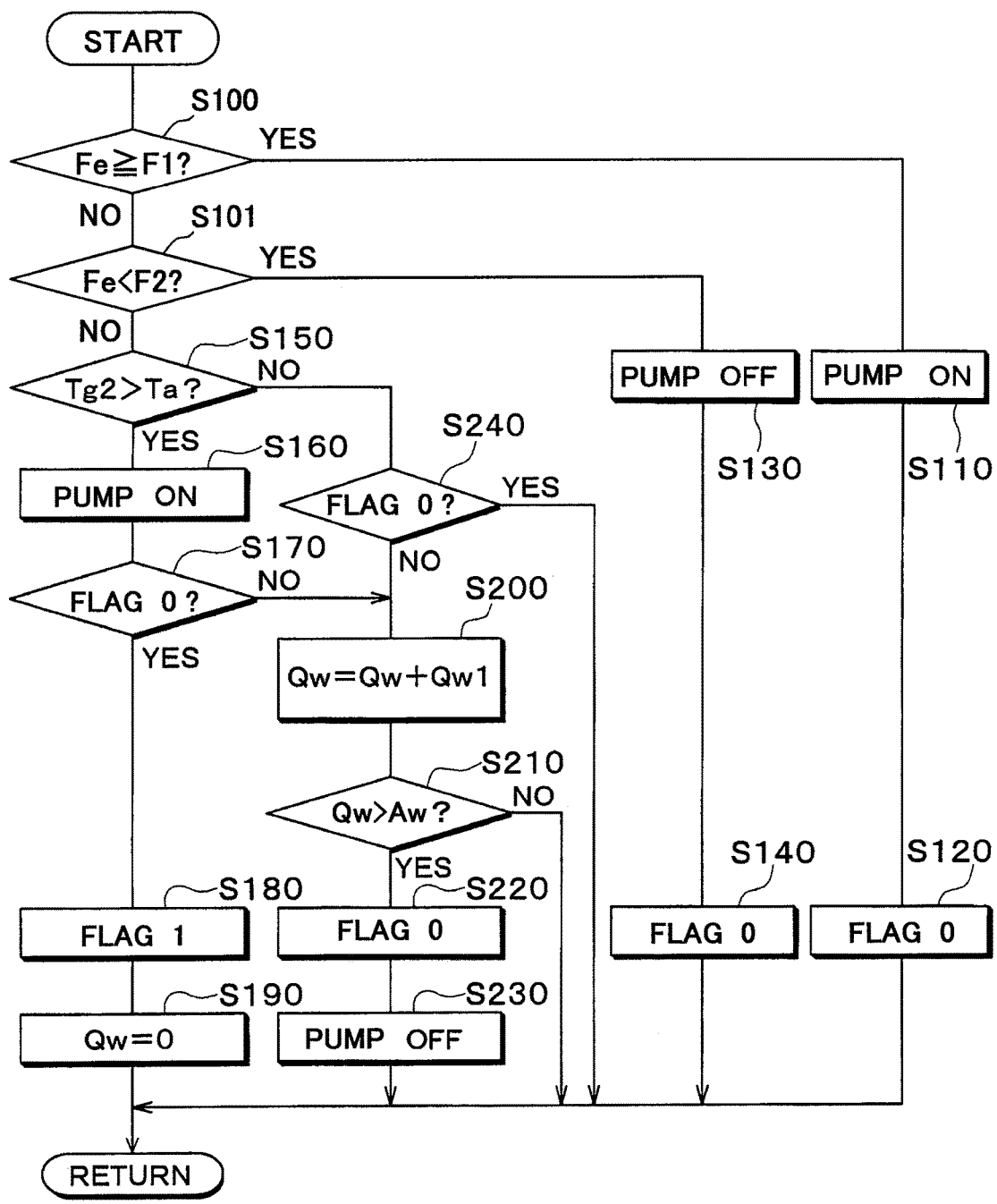
FIG. 3 is a flowchart depicting control processing performed by a control device of the intake air cooling device of the first embodiment.

An operation of the configuration as above will now be described. While the engine 12 is running after an ignition switch of the vehicle was switched ON (activated), the control device 30 performs control processing depicted in a flowchart of FIG. 3.

Firstly in Steps S100 and S101, a degree of load on the engine 12 is determined. For example, the control device 30 calculates an engine load value Fe on the basis of information on an operation state, such as an engine speed and an amount of intake air, and determines a degree of load on the engine 12 by comparing the engine load value Fe with a first threshold F1 and a second threshold F2. The first threshold F1 and the second threshold F2 are predetermined set values pre-stored in the control device 30. The second threshold F2 is set to a value smaller than a value of the first threshold F1.

When the engine load value Fe is equal to or greater than the first threshold F1, it is determined that a load on the engine 12 is high. When the engine load value Fe is less than the second threshold F2, it is determined that a load on the engine 12 is low. When the engine load value Fe is equal to or greater than the second threshold F2 and less than the first threshold F1, it is determined that a load on the engine 12 is moderate.

Alternatively, a load on the engine 12 may be determined on the basis of the intercooler inlet-side intake air temperature Tg1. More specifically, when the intercooler inlet-side intake air temperature Tg1 is high, it may be determined that a load on the engine 12 is high. When the intercooler inlet-side intake air temperature Tg1 is low, it may be determined that a load on the engine 12 is low. When the intercooler inlet-side intake air temperature Tg1 is a moderate temperature, it may be determined that a load on the engine 12 is moderate.

When it is determined in Step S100 that a load on the engine 12 is high (Fe≥F1), advancement is made to Step S110, in which the pump 14 is turned ON (operated). The coolant water is thus circulated in the coolant water circuit 11. Hence, the intake air can be cooled in the intercooler 15 when a load on the engine 12 is high.

When the intake air is cooled, condensed water is generated in the intercooler 15. However, because a flow rate of the intake air is extremely high when a load on the engine 12 is high, an adverse effect of the condensed water is limited. To be more specific, an engine misfire caused by condensed water hardly occurs. In addition, when a flow rate of the intake air is extremely high, condensed water hardly remains in the intercooler 15. Hence, corrosion hardly develops in the intercooler 15.

After a value of a flag is set to 0 in subsequent Step S120, the flow returns to Step S100. The flag is a variable indicating whether it is necessary to calculate a value of an accumulated flow amount Qw. The accumulated flow amount Qw is a total volume of the coolant water supplied to the intercooler 15 while the pump 14 is turned ON and OFF (operated and stopped) once.

When it is determined in Step S100 that a load on the engine 12 is not high (Fe<F1), advancement is made to Step S101. When it is determined in Step S101 that a load on the engine 12 is low (Fe<F2), advancement is made to Step S130, in which the pump 14 is turned OFF (stopped). Because the coolant water is no longer circulated in the cooling water circuit 11, a temperature of the intake air can be restricted from falling too low in the intercooler 15 when a load on the engine 12 is low.

After a value of the flag is set to 0 in subsequent Step S140, the flow returns to Step S100.

When it is determined in Step S101 that a load on the engine 12 is not low (Fe≥F2), that is, when it is determined that a load on the engine 12 is moderate (F2≤Fe<F1), advancement is made to Step S150, in which whether the intercooler outlet-side intake air temperature Tg2 is higher than a third threshold Ta is determined. The third threshold Ta is a predetermined set value pre-stored in the control device 30.

When it is determined in Step S150 that the intercooler outlet-side intake air temperature Tg2 is higher than the third threshold Ta, advancement is made to Step S160, in which the pump 14 is turned ON (operated). Because the coolant water is circulated in the cooling water circuit 11, the intake air can be cooled in the intercooler 15 when a load on the engine 12 is moderate and the intercooler outlet-side intake air temperature Tg2 is high.

Herein, driving of the pump 14 is controlled so as to maintain a discharge flow rate (a volume of the coolant water forced out per unit time) substantially constant.

In subsequent Step S170, whether a value of the flag is 0 or 1 is determined. When it is determined that a value of the flag is 0, advancement is made to Step S180, in which a value of the flag is set to 1. After a value of the accumulated flow amount Qw is reset to 0 in subsequent Step S190, the flow returns to Step S100.

When it is determined in Step S170 that a value of the flag is 1, advancement is made to Step S200, in which the accumulated flow amount Qw is calculated. More specifically, a sum of the accumulated flow amount Qw up to a present time and a volume of the coolant water newly supplied, Qw1, is found as a new accumulated flow amount Qw (Qw=Qw+Qw1).

For example, the volume of the coolant water newly supplied, Qw1, can be calculated by multiplying a discharge flow rate of the pump 14 by a discharge time (Qw1=discharge flow rate×discharge time). A discharge flow rate of the pump 14 is a volume of the coolant water that the pump 14 forces out per unit time. A discharge time is a time elapsed since the last accumulated flow amount Qw was calculated.

In subsequent Step S210, whether the accumulated flow amount Qw calculated in Step S170 is higher than a fourth threshold Aw is determined. The fourth threshold Aw is a predetermined set value pre-stored in the control device 30. The fourth threshold Aw is equal to a value of an inner volumetric capacity C1 of the intake-air downstream-side core portion 151 in the intercooler 15. The inner volumetric capacity C1 of the intake-air downstream-side core portion 151 is a volumetric capacity of a tube group forming the intake-air downstream-side core portion 151 (a volumetric capacity of a channel where the coolant water flows).

When it is determined that the accumulated flow amount Qw newly calculated is higher than the fourth threshold Aw, advancement is made to S220 and S230. Hence, after a value of the flag is set to 0 and the pump 14 is turned OFF (stopped), the flow returns to Step S100. Consequently, the coolant water can be blocked so as not to flow through the intercooler 15 when the accumulated flow amount Qw becomes higher than the fourth threshold Aw.

On the other hand, when it is determined that the accumulated flow amount Qw newly calculated is equal to or lower than the fourth threshold Aw, the flow returns to Step S100. Consequently, the coolant water is allowed to continue to flow through the intercooler 15 when the accumulated flow amount Qw is equal to or lower than the fourth threshold Aw.

Accordingly, an amount of flow (accumulated flow amount Qw) of the coolant water through the intercooler 15 in a period between once turning ON and OFF (i.e. activating and stopping) of the pump 14 can be made equal or nearly equal to the inner volumetric capacity C1 of the intake-air downstream-side core portion 151 in the intercooler 15.

When it is determined in Step S150 that the intercooler outlet-side intake air temperature Tg2 is equal to or lower than the third threshold Ta, advancement is made to Step S240, in which whether a value of the flag is 0 or 1 is determined.

When it is determined in Step S240 that a value of the flag is 1, advancement is made to Step S200, in which the accumulated flow amount Qw is calculated. When it is determined in Step S240 that a value of the flag is 0, the flow returns to Step S100. In such a case, the coolant water is kept blocked so as not to flow through the intercooler 15.

Figure 4:
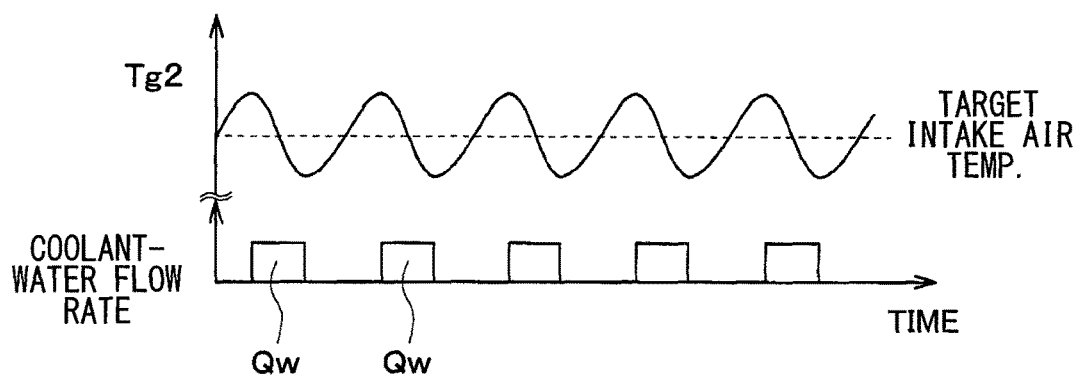
FIG. 4 is a diagram showing one example of a control result of the intake air cooling device of the first embodiment.

FIG. 4 shows one example of a control result when a load on the engine 12 is moderate. That is to say, the coolant water is allowed to flow through the intercooler 15 when the intercooler outlet-side intake air temperature Tg2 rises. Accordingly, the intake air is cooled in the intercooler 15 and the intercooler outlet-side intake air temperature Tg2 falls.

When a volume of the coolant water supplied to the intercooler 15 reaches the predetermined volume Aw, the coolant water is blocked so as not to flow through the intercooler 15. Accordingly, the intercooler outlet-side intake air temperature Tg2 rises.

By repeating a cycle in which the intercooler outlet-side intake air temperature Tg2 rises and falls in the manner as above, the intercooler outlet-side intake air temperature Tg2 is adjusted to be as close as possible to a target intake air temperature.

Figure 5:
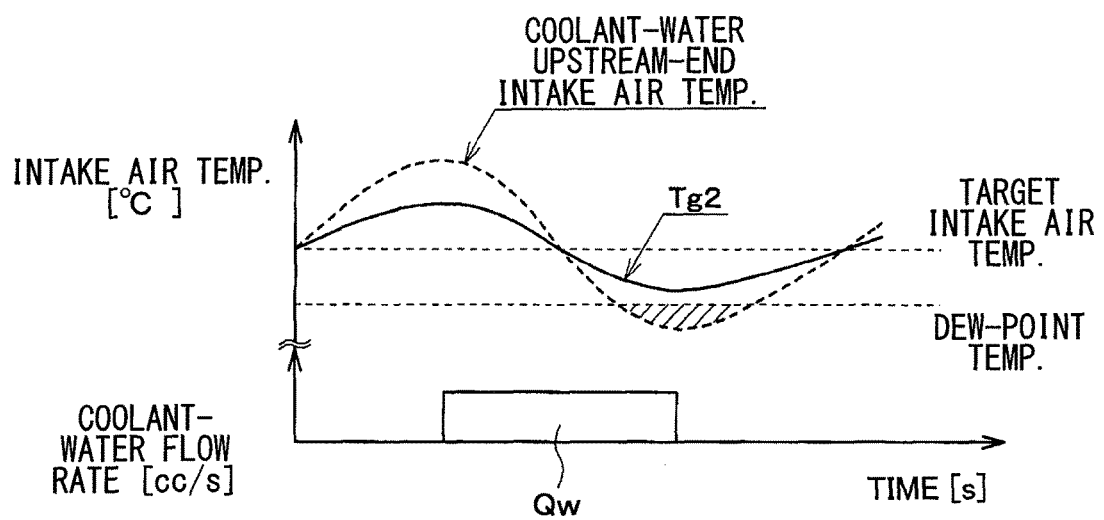
FIG. 5 shows a graph indicating time variations in an intercooler outlet-side intake air temperature and a coolant-water flow rate of the intake air cooling device of the first embodiment.

A solid line of FIG. 5 indicates a variance in the intercooler outlet-side intake air temperature Tg2 in one cycle. The intercooler outlet-side intake air temperature Tg2 is a temperature found by averaging a temperature distribution. In contrast, a broken line of FIG. 5 indicates a local intercooler outlet-side intake air temperature (hereinafter, referred to as the coolant-water upstream-end intake air temperature) near an upstream end of the intercooler 15 in a flow of the coolant water.

When the pump 14 is turned ON (operated) and the coolant water is supplied to the intercooler 15, the coolant-water upstream-end intake air temperature (local temperature) becomes lower than the intercooler outlet-side intake air temperature Tg2 (average temperature).

Condensed water is generated from the intake air when the coolant-water upstream-end intake air temperature (local temperature) falls below a dew-point temperature (a time indicated by a shaded region of FIG. 5).

In the present embodiment, the pump 14 is turned OFF (stopped) when it is determined in Step S210 that the accumulated flow amount Qw is higher than the fourth threshold Aw. Hence, a total volume (accumulated flow amount Qw) of the coolant water supplied to the intercooler 15 while the pump 14 is turned ON and OFF (operated and stopped) once becomes equal or nearly equal to the inner volumetric capacity C1 of the intake-air downstream-side core portion 151 in the intercooler 15. Consequently, generation of condensed water can be restricted as the intercooler outlet-side intake air temperature Tg2 is adjusted to be as close as possible to the target intake air temperature. A reason why generation of condensed water can be restricted will be described in the following.

Figure 6:
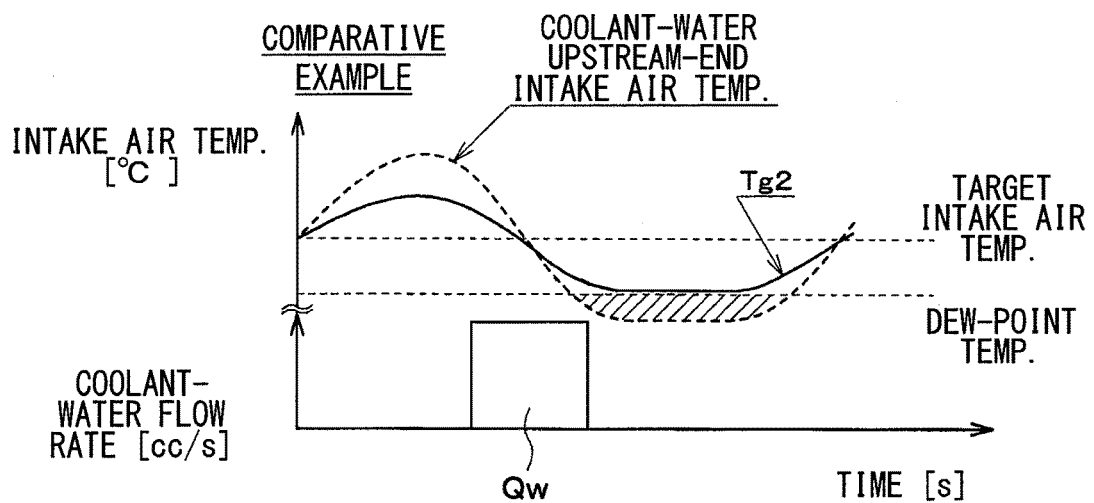
FIG. 6 shows a graph indicating time variations in an intercooler outlet-side intake air temperature and a coolant-water flow rate of an intake air cooling device according to a first comparative example of the present disclosure.

In a first comparative example shown in FIG. 6, the accumulated flow amount Qw while the pump 14 is turned ON and OFF (operated and stopped) once is higher than the inner volumetric capacity C1 of the intake-air downstream-side core portion 151. Hence, in the first comparative example, when the pump 14 is turned ON and OFF (operated and stopped) once, the intake-air downstream-side core portion 151 is filled with the coolant water and also the coolant water flows into a part of the intake-air upstream-side core portion 152.

Accordingly, not only the intake-air downstream-side core portion 151 but also the intake-air upstream-side core portion 152 is cooled and the intercooler 15 is cooled more than necessary. The coolant-water upstream-end intake air temperature (local temperature) thus stays below the dew-point temperature for a longer time. Consequently, a large amount of condensed water is generated.

Figure 7:
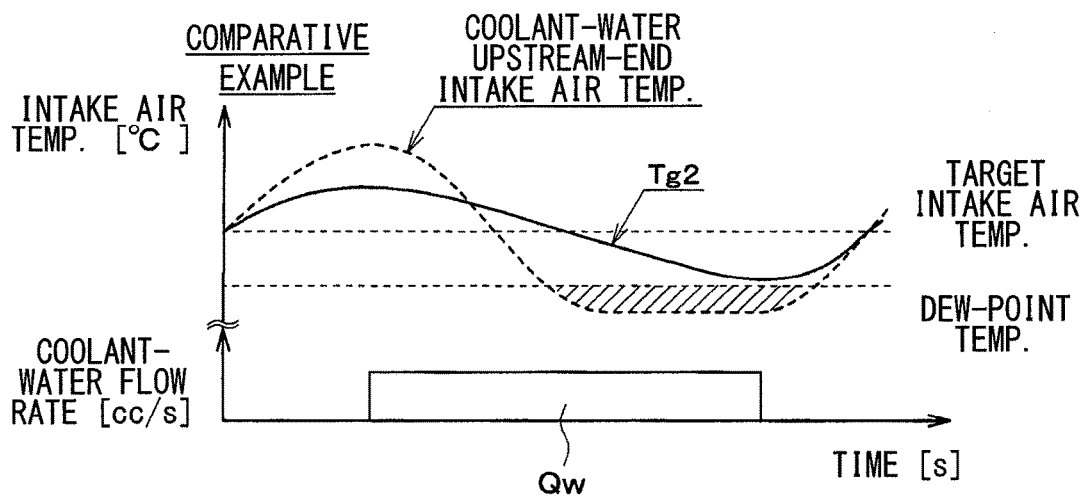
FIG. 7 shows a graph indicating time variations in an intercooler outlet-side intake air temperature and a coolant-water flow rate of an intake air cooling device according to a second comparative example of the present disclosure.

In a second comparative example shown in FIG. 7, the accumulated flow amount Qw while the pump 14 is turned ON and OFF (operated and stopped) once is lower than the inner volumetric capacity C1 of the intake-air downstream-side core portion 151. Hence, in the second comparative example, when the pump 14 is turned ON and OFF (operated and stopped) once, the intake-air downstream-side core portion 151 is not filled with the coolant water. Hence, a temperature distribution of the intake air becomes wider on the outlet side of the intercooler 15.

More specifically, an intake air temperature in the intake-air downstream-side core portion 151 becomes low near the upstream end in a flow of the coolant water because the coolant water is cold whereas an intake air temperature in the intake-air downstream-side core portion 151 becomes high near a downstream end in a flow of the coolant water because the coolant water is hot.

It thus takes a time for the intercooler outlet-side intake air temperature Tg2 (average temperature) to fall. Accordingly, the coolant water has to be supplied to the intercooler 15 for a longer time in order to adjust the intercooler outlet-side intake air temperature Tg2 to be as close as possible to the target intake air temperature. Consequently, because the coolant-water upstream-end intake air temperature (local temperature) stays below the dew-point temperature for a longer time, a large amount of condensed water is generated.

In contrast, in the present embodiment, the accumulated flow amount Qw while the pump 14 is turned ON and OFF (operated and stopped) once is equal or nearly equal to the inner volumetric capacity C1 of the intake-air downstream-side core portion 151 in the intercooler 15. Hence, the coolant water flowing into the intake-air upstream-side core portion 152 can be restricted while the intake-air downstream-side core portion 151 is filled with the coolant water.

Accordingly, a time during which the coolant-water upstream-end intake air temperature (local temperature)

stays below the dew-point temperature can be shorter. Consequently, generation of condensed water can be restricted as the intercooler outlet-side intake air temperature Tg2 (average temperature) is adjusted to be as close as possible to the target intake temperature.

Hence, an adverse effect given to an engine operation such that causes an engine misfire or the like can be restricted and also development of corrosion in the intercooler 15 can be restricted.

Figure 8:
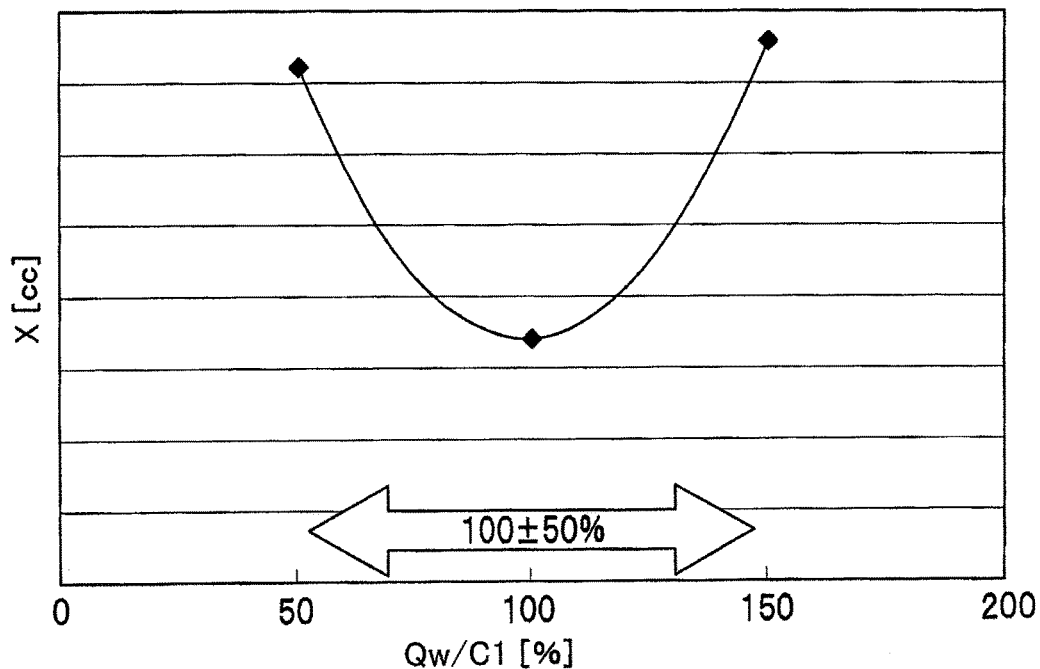
FIG. 8 shows a graph showing a relation between an accumulated flow amount and an amount of generated condensed water in the intake air cooling device of the first embodiment.

As is shown in FIG. 8, when the accumulated flow amount Qw is from 50% to 150% of the inner volumetric capacity C1 of the intake-air downstream-side core portion 151, an amount of condensed water, X, generated in one cycle can be restricted satisfactorily. When the accumulated flow amount Qw is from 75% to 125% of the inner volumetric capacity C1 of the intake-air downstream-side core portion 151, the amount of condensed water, X, generated in one cycle can be restricted more satisfactorily. When the accumulated flow amount Qw is from 95% to 105% of the inner volumetric capacity C1 of the intake-air downstream-side core portion 151, the amount of condensed water, X, generated in one cycle can be restricted significantly.

That is to say, the amount of condensed water, X, generated in one cycle can be restricted more satisfactorily as the accumulated flow amount Qw is closer to 100% of the inner volumetric capacity C1 of the intake-air downstream-side core portion 151.

It is preferable to maximize a discharge flow rate (a volume of the coolant water forced out per unit time) of the pump 14 during an operation as above. When a discharge flow rate is maximized, a time while the pump 14 is turned ON and OFF (operated and stopped) once can be shorter and a time during which the coolant-water upstream-end intake air temperature (local temperature) stays at or below the dew-point temperature can be further shorter. Hence, generation of condensed water can be restricted further.

In the present embodiment, a discharge flow rate of the pump 14 per second (a volume of the coolant water that the pump 14 forces out for one second) is equal or nearly equal to the fourth threshold Aw. Hence, it takes about one second to turn ON and OFF (operate and stop) the pump 14 once. A discharge flow rate of the pump 14 per second can be changed to suit specifications of the pump 14 or the like.

In the present embodiment, the control device 30 forms a flow rate control device which controls a flow rate Qw of the coolant water to be supplied to the intercooler 15. The control device 30 intermittently supplies the intercooler 15 with the predetermined volume Aw of the coolant water at a time. The predetermined volume Aw is a value determined on the basis of the volumetric capacity C1 of the coolant water channels (cooling fluid channel) in the intake-air downstream-side core portion 151.

According to the configuration as above, an inconvenience caused when an amount of the coolant water supplied to the intercooler 15 is too large for the volumetric capacity C1 of the coolant water channels in the intake-air downstream-side core portion 151, that is, an inconvenience that the intake-air downstream-side core portion 151 is cooled more than necessary can be restricted. In addition, an inconvenience caused when an amount of the coolant water supplied to the intercooler 15 is too small for the volumetric capacity C1 of the coolant water channels in the intake-air downstream-side core portion 151, that is, an inconvenience that a temperature distribution develops in the intake-air downstream-side core portion 151 can be restricted. Hence, generation of condensed water from the intake air can be restricted.

To be more specific, generation of condensed water from the intake air can be restricted in a reliable manner when the predetermined volume Aw is, as is shown in FIG. 8, from 50% to 150% of the volumetric capacity C1 of the coolant water channels in the intake-air downstream-side core portion 151.

In the present embodiment, the control device 30 intermittently supplies the intercooler 15 with the predetermined volume Aw of the coolant water at a time when the temperature Tg1 of the intake air before passing through the intercooler 15 is within a predetermined range or the load Fe on the engine 12 is within a predetermined range.

When the temperature Tg1 of the intake air before passing through the intercooler 15 is above the predetermined range or the load Fe on the engine 12 is above the predetermined range, the control device 30 continuously supplies the intercooler 15 with the coolant water.

When the temperature Tg1 of the intake air before passing through the intercooler 15 is below the predetermined range or the load Fe on the engine 12 is below the predetermined range, the control device 30 does not supply the intercooler 15 with the coolant water.

According to the configuration as above, when the load Fe on the engine 12 is moderate, the intercooler 15 is intermittently supplied with the predetermined volume Aw of the coolant water at a time. Hence, generation of condensed water can be restricted.

When the load Fe on the engine 12 is high, the intake air can be cooled sufficiently because the coolant water is continuously supplied to the intercooler 15. Herein, condensed water may be generated continuously. However, because an amount of the intake air is large when the load Fe on the engine 12 is high, problems, such as an engine misfire and corrosion in the intercooler 15, hardly occur even when condensed water is generated continuously.

When the load Fe on the engine 12 is low, the intake air is not cooled in the intercooler 15 because the coolant water is not supplied to the intercooler 15. Hence, the intake air can be restricted from becoming too cold. Because the intake air is not cooled in the intercooler 15, generation of condensed water can be restricted.

In the present embodiment, the control device 30 intermittently supplies the intercooler 15 with the predetermined volume Aw of the coolant water at a time by starting a supply of the coolant water to the intercooler 15 when the temperature Tg2 of the intake air after passing through the intercooler 15 rises above the threshold Ta and by stopping a supply of the coolant water to the intercooler 15 when the accumulated flow amount Qw of the coolant water supplied to the intercooler 15 reaches the predetermined volume Aw.

Consequently, because a supply of the coolant water to the intercooler 15 can be controlled appropriately, generation of condensed water can be restricted appropriately.

In the present embodiment, the control device 30 controls a flow rate of the coolant water to be supplied to the intercooler 15 by controlling the pump 14 to start and stop. Hence, a flow rate of the coolant to be supplied to the intercooler 15 can be controlled appropriately.

When a volumetric flow rate of the coolant water that the pump 14 forces out per second is equal to the predetermined volume Aw, the coolant water can be supplied to the intercooler 15 in a short time. Accordingly, a time during which the coolant-water upstream-end intake air temperature (local temperature) stays at or below the dew-point temperature can be further shorter. Hence, generation of condensed water can be restricted further.

Second Embodiment

In the first embodiment above, a flow of the coolant water takes a turn once at the heat-exchanging core portions 151 and 152 in the intercooler 15. In the present embodment, as are shown in FIG. 9 and FIG. 10, a flow of coolant water takes a turn at least twice at heat-exchanging core portions 151 and 152 in an intercooler 15.

Figure 9:
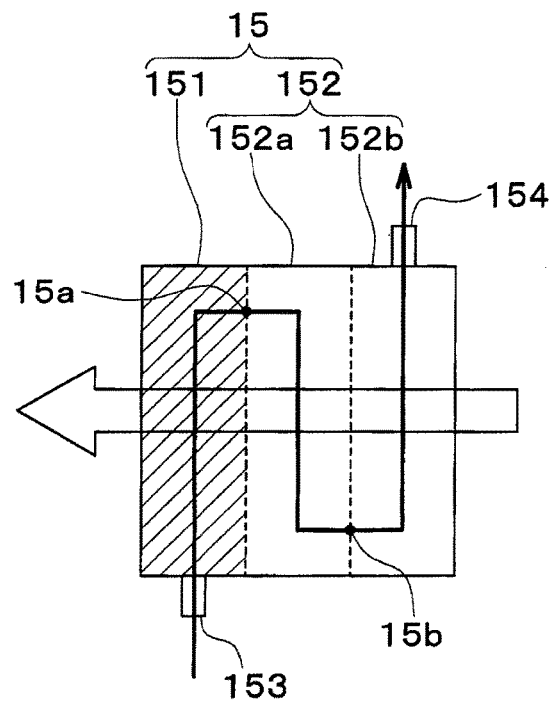
FIG. 9 is a schematic diagram of an intercooler of a first example according to a second embodiment of the present disclosure.
Figure 10:
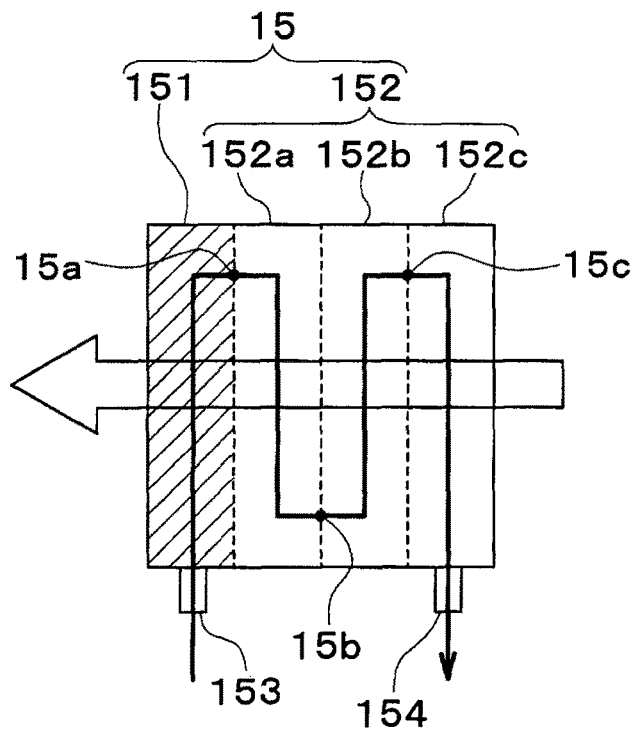
FIG. 10 is a schematic diagram of an intercooler of a second example according to the second embodiment of the present disclosure.

In a first example shown in FIG. 9, a flow of coolant water takes a turn twice. More specifically, a flow of the coolant water takes a turn at a U-turn portion 15a between an intake-air downstream-side core portion 151 and a first core portion 152a of an intake-air upstream-side core portion 152 in an intercooler 15. Further, a flow of the coolant water takes another turn at a U-turn portion 15b between the first core portion 152a and a second core portion 152b of the intake-air upstream-side core portion 152.

The first core portion 152a is a portion of the intake-air upstream-side core portion 152 on an upstream side in a flow of the coolant water. The second core portion 152b is a portion of the intake-air upstream-side core portion 152 on a downstream side in a flow of the coolant water. The first core portion 152a is located downstream of the second core portion 152b in a flow of intake air.

The intake-air downstream-side core portion 151, the first core portion 152a, and the second core portion 152b have inner volumetric capacities equal or nearly equal to one another.

In a second example shown in FIG. 10, a flow of coolant water takes a turn three times. More specifically, a flow of the coolant water takes a turn at a U-turn portion 15a between an intake-air downstream-side core portion 151 and a first core portion 152a of an intake-air upstream-side core portion 152 in an intercooler 15. Further, a flow of the coolant water takes another turn at a U-turn portion 15b between the first core portion 152a and a second core portion 152b of the intake-air upstream-side core portion 152, and takes still another turn at a U-turn portion 15c between the second core portion 152b and a third core portion 152c of the intake-air upstream-side core portion 152.

The first core portion 152a is a portion of the intake-air upstream-side core portion 152 on an upstream side in a flow of the coolant water. The third core portion 152c is a portion of the intake-air upstream-side core portion 152 on a downstream side in a flow of the coolant water. The second core portion 152b is a portion of the intake-air upstream-side core portion 152 located downstream of the first core portion 152a in a flow of the coolant water and upstream of the third core portion 152c in a flow of the coolant water.

The first core portion 152a is located downstream of the second core portion 152b in a flow of intake air. The second core portion 152b is located downstream of the third core portion 152a in a flow of the intake air.

The intake-air downstream-side core portion 151, the first core portion 152a, the second core portion 152b, and the third core portion 152c have inner volumetric capacities equal or nearly equal to one another.

In the present embodiment, too, when an accumulated flow amount $Q_w$ is from 50% to 150% of an inner volumetric capacity $C_1$ of the intake-air downstream-side core portion 151, an amount of condensed water, X, generated in one cycle can be restricted satisfactorily as in the first embodiment above. When the accumulated flow amount $Q_w$ is from 75% to 125% of the inner volumetric capacity $C_1$ of the intake-air downstream-side core portion 151, the amount of condensed water, X, generated in one cycle can be restricted more satisfactorily. When the accumulated flow amount $Q_w$ is from 95% to 105% of the inner volumetric capacity $C_1$ of the intake-air downstream-side core portion 151, the amount of condensed water, X, generated in one cycle can be restricted significantly.

That is to say, the amount of condensed water, X, generated in one cycle can be restricted more satisfactorily as the accumulated flow amount $Q_w$ is closer to 100% of the inner volumetric capacity $C_1$ of the intake-air downstream-side core portion 151.

When the present embodiment is compared with the first embodiment above, a proportion of a volumetric capacity of a coolant water channel of the intake-air downstream-side core portion 151 can be smaller and hence a predetermined volume Aw can take a smaller value. Consequently, because a flow rate of the coolant water to be supplied to the intercooler 15 can be decreased, power of a pump 14 can be reduced.

Third Embodiment

Figure 11:
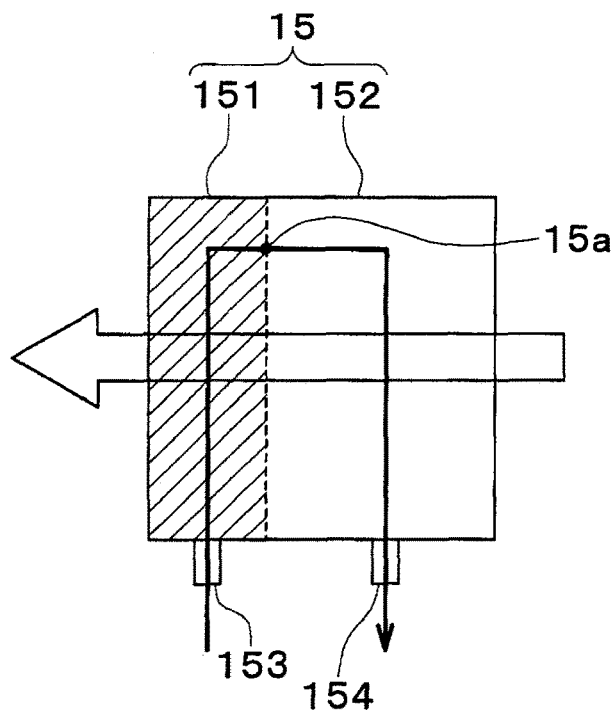
FIG. 11 is a schematic diagram of an intercooler according to a third embodiment of the present disclosure.

In contrast to the first embodiment above where the inner volumetric capacity $C_1$ of the intake-air downstream-side core portion 151 is same as an inner volumetric capacity of the intake-air upstream-side core portion 152 in the intercooler 15, in the present embodiment, as is shown in FIG. 11, an inner volumetric capacity $C_1$ of an intake-air downstream-side core portion 151 is smaller than an inner volumetric capacity of an intake-air upstream-side core portion 152.

Owing to the configuration as above, because the inner volumetric capacity $C_1$ of the intake-air downstream-side core portion 151 can be made smaller, a predetermined volume Aw can be reduced. Hence, because a flow rate of coolant water to be supplied to an intercooler 15 can be decreased, power of a pump 14 can be reduced.

Fourth Embodiment

Figure 12:
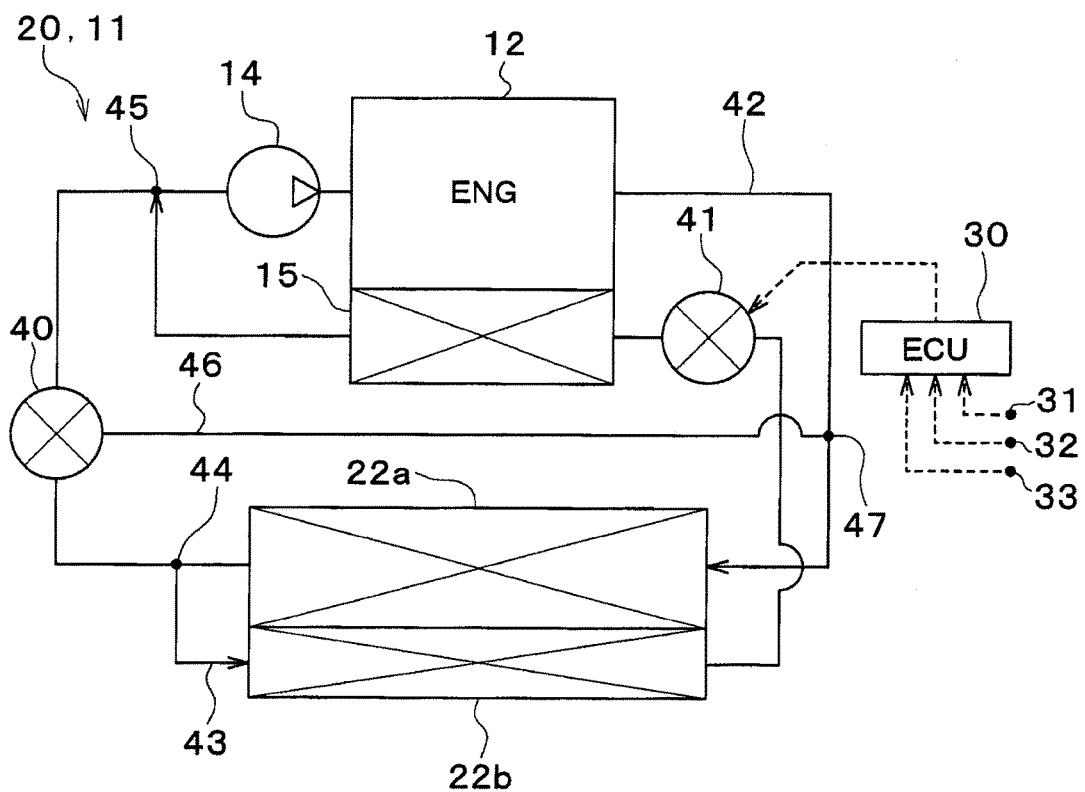
FIG. 12 is a schematic diagram of an intake air cooling device according to a fourth embodiment of the present disclosure.

In the present embodiment, as is shown in FIG. 12, a configuration of an engine cooling circuit 20 and a coolant water circuit 11 is changed from the configuration in the embodiments above.

The engine cooling circuit 20 and the coolant water circuit 11 are formed integrally into one unit, which is provided with a pump 14, a first radiator 22a, a circulation channel on-off valve 40, a second radiator 22b, an intercooler 15, and an intake air cooling channel on-off valve 41.

The pump 14 of the present embodiment is a mechanical pump driven by power of an engine 12. Hence, the pump 14 constantly draws coolant water into itself and forces the coolant water out while the engine 12 is running.

The pump 14, the engine 12, the first radiator 22a, and the circulation channel on-off valve 40 are sequentially disposed in a circulation channel 42 where the coolant water is circulated in order of being mentioned.

The first radiator 22a and the second radiator 22b are heat exchangers which cool the coolant water by letting the coolant water flowed out from the engine 12 exchange heat with outside air. In other words, the first radiator 22a is a heat radiator which dissipates heat carried by the coolant water to outside air.

The circulation channel on-off valve 40 is a thermostat which opens and closes the circulation channel 42 according to a temperature of the coolant water. The thermostat is a valve actuated by a coolant water temperature which is formed of a mechanical mechanism configured to open and close a coolant water channel by displacing a valve body using thermo-wax (temperature-sensitive member) that undergoes volume change with a temperature.

The circulation channel on-off valve 40 closes when a coolant water temperature Tw (cooling fluid temperature) is as high as or below a first predetermined temperature Tw1 and opens when the coolant water temperature Tw is as high as or above the first predetermined temperature Tw1. In the present embodiment, the first predetermined temperature Tw1 is set to 80° C.

The second radiator 22b, the intercooler 15, and the intake air cooling channel on-off valve 41 are disposed in an intake air cooling channel 43. The intake air cooling channel 43 is a channel branching from the circulation channel 42 and merging with the circulation channel 42.

A branch portion 44 at which the intake air cooling channel 43 branches from the circulation channel 42 is provided between the first radiator 22a and the circulation channel on-off valve 40. A merge portion 45 at which the intake air cooling channel 43 merges with the circulation channel 42 is provided between the circulation channel on-off valve 40 and the pump 14.

In a case of FIG. 12, the second radiator 22b is provided integrally with the first radiator 22a. However, the second radiator 22b may be provided separately from the first radiator 22a.

A coolant water inlet side of the intercooler 15 is connected to a coolant water outlet side of the second radiator 22b. A coolant water outlet side of the intercooler 15 is connected to a coolant water inlet side of the pump 14.

The intake air cooling channel on-off valve 41 is an interruption device which interrupts a flow of the coolant water in the intake air cooling channel 43. The intake air cooling channel on-off valve 41 is en electronically-controlled valve controlled by a control device 30 to open and close.

In the case of FIG. 12, the intake air cooling channel on-off valve 41 is located downstream of the second radiator 22b in a flow of the coolant water. However, the intake air cooling channel on-off valve 41 may be located upstream of the second radiator 22b in a flow of the coolant water.

The control device 30 controls the intake air cooling channel on-off valve 41 to close when the coolant water temperature Tw is as high as or below a second predetermined temperature Tw2 and controls the intake air cooling channel on-off valve 41 to open when the coolant water temperature Tw is as high as or above the second predetermined temperature Tw2. In the present embodiment, the second predetermined temperature Tw2 is set to a range of 40° C. to 60° C., both inclusive.

A bypass channel 46 is a channel where the coolant water flows by bypassing the first radiator 22a, the second radiator 22b, and the intercooler 15. The bypass channel 46 branches from the circulation channel 42 at a bypass channel branch portion 47 and merges with the circulation channel 42 via the circulation channel on-off valve 40. The bypass channel branch portion 47 is provided between the engine 12 and the first radiator 22a.

The bypass channel 46 may merge with the circulation channel 42 on a coolant water outlet side of the circulation channel on-off valve 40 and on a coolant water inlet side of the pump 14.

A channel resistance when the coolant water is circulated by way of the bypass channel 46 is extremely larger than a channel resistance when the coolant water is circulated by way of the other channels 42 and 43. Hence, in a case where at least one of the circulation channel on-off valve 40 and the intake air cooling channel on-off valve 41 is open, the coolant water hardly flows the bypass channel 46.

An operation by the configuration as above will now be described. While the engine 12 is stopped (hereinafter, referred to as an engine stop state), because the engine 12 does not generate drive power, the pump 14 is stopped and no coolant water is circulated.

In addition, because the engine 12 does not generate heat in the engine stop state, the coolant water temperature Tw is as high as an outside air temperature Tatm. That is to say, in the engine stop state, the coolant water temperature Tw is as high as or below the second predetermined temperature Tw2 (in the present embodiment, in a range of 40° C. to 60° C., both inclusive). Hence, the intake air cooling channel on-off valve 41 and the circulation channel on-off valve 40 are closed.

When the engine 12 is started, the engine 12 generates drive power and heat. Accordingly, the pump 14 is operated to draw the coolant water into itself and force the coolant water out and the coolant water temperature Tw rises gradually.

While the coolant water temperature Tw is as high as or below the second predetermined temperature Tw2 (hereinafter, referred to as the first warm-up state), the intake air cooling channel on-off valve 41 and the circulation channel on-off valve 40 are closed because the coolant water temperature Tw is as high as or below the second predetermined temperature Tw2. Hence, the coolant water forced out from the pump 14 is drawn into the pump 14 by flowing through the engine 12 and the bypass channel 46.

Accordingly, the coolant water does not flow through the first radiator 22a, the second radiator 22b, and the intercooler 15. Hence, heat carried by the coolant water is not dissipated in the first radiator 22a and the second radiator 22b and the coolant water temperature Tw rises quickly. When the coolant water temperature Tw rises quickly, fuel efficiency is improved quickly.

In the first warm-up state, the coolant water does not flow through the intercooler 15 and supercharged air is not cooled in the intercooler 15. However, because intake pipes and a supercharger are cold immediately after the engine 12 is started, it is rarely necessary to cool the supercharged air in the intercooler 15. In addition, because a heat capacity of the intercooler 15 is large, no problem occurs even when the coolant water does not flow through the intercooler 15.

While the coolant water temperature Tw is as high as or above the second predetermined temperature Tw2 (in the present embodiment, 40° C. to 60° C.)(hereinafter, referred to as the second warm-up state), the intake air cooling channel on-off valve 41 is open and the circulation channel on-off valve 40 is closed. Hence, the coolant water forced out from the pump 14 is drawn into the pump 14 by flowing through the first radiator 22a, the second radiator 22b, and the intercooler 15.

As has been described, in the second warm-up state, the coolant water cooled in the first radiator 22a and the second radiator 22b flows through the intercooler 15. Hence, supercharged air is cooled in the intercooler 15.

In the second warm-up state, heat carried by the coolant water is dissipated in the first radiator 22a and the second radiator 22b. Hence, the coolant water temperature Tw rises moderately in comparison with the first warm-up state. However, fuel efficiently is improved substantially as good as post-warm-up fuel efficiency once the coolant water temperature Tw rises to 40 to 60° C. Hence, an influence of such a moderate temperature rise on the fuel efficiency is negligible.

While the coolant water temperature Tw is as high as or above the first predetermined temperature Tw1 (in the present embodiment, 80° C.)(hereinafter, referred to as the post-warm-up state), the intake air cooling channel on-off valve 41 and the circulation channel on-off valve 40 are open. Hence, the coolant water forced out from the pump 14 flows through the first radiator 22a and branches at a branch portion 44 to a high-temperature-side flow FH which bypasses the second radiator 22b and the intercooler 15 and a low-temperature-side flow FL which flows through the second radiator 22b and the intercooler 15. The high-temperature-side flow FH and the low-temperature-side flow FL merge at a merge portion 45 and the coolant water is drawn into the pump 14.

Owing to the configuration as above, the coolant water is cooled in the first radiator 22a and a part of the coolant water cooled in the first radiator 22a is further cooled in the second radiator 22b and the coolant water cooled in the second radiator 22b cools supercharged air in the intercooler 15.

Further, in the post-warm-up state, when it is determined that a load on the engine 12 is moderate, the control device 30 intermittently supplies the intercooler 15 with the coolant water by opening and closing the intake air cooling channel on-off valve 41.

More specifically, when it is determined that an intercooler outlet-side intake air temperature Tg2 is higher than the third threshold Ta described above, the control device 30 allows the coolant water to flow through the intercooler 15 by opening the intake air cooling channel on-off valve 41.

When it is determined that an accumulated flow amount Qw is higher than the fourth threshold Aw described above, the control device 30 blocks the coolant water so as not to flow through the intercooler 15 by closing the intake air cooling channel on-off valve 41.

In other words, the control device 30 controls the intake air cooling channel on-off valve 41 to open and close so as to make an accumulated flow amount (a total volume of the coolant water supplied to the intercooler 15) while the intake air cooling channel on-off valve 41 is opened and closed once equal or nearly equal to an inner volumetric capacity C1 of an intake-air downstream-side core portion 151 in the intercooler 15.

Consequently, as in the embodiments above, because a time during which a coolant-water upstream-end intake air temperature (local temperature) stays at or below a dew-point temperature can be shorter, generation of condensed water can be restricted. Hence, an adverse effect given to an engine operation such that causes an engine misfire or the like can be restricted and also development of corrosion in the intercooler 15 can be restricted.

In the present embodiment, the control device 30 and the channel on-off valve 41 together form a flow rate control device which controls a flow rate of the coolant water to be supplied to the intercooler 15. In short, the control device 30 and the channel on-off valve 41 control a flow rate of the coolant water to be supplied to the intercooler 15 by opening and closing a channel of the coolant water.

Because the pump 14 is a mechanical pump driven by power of the engine 12, the pump 14 may not be turned ON and OFF arbitrarily under control. However, even in such a case, a flow rate of the coolant water to be supplied to the intercooler 15 can be controlled appropriately by the configuration as above.

Other Embodiments

The embodiments above may be combined as needed. The embodiments above may be modified in various manners, for example, as described in the following.

(1) In the embodiments above, the coolant water is blocked so as not to flow through the intercooler 15 when the accumulated flow amount Qw becomes higher than the fourth threshold (predetermined volume) Aw. However, the coolant water may be blocked so as not to flow through the intercooler 15 after an elapse of a predetermined time (for example, one second) since the coolant water started flowing through the intercooler 15.

In such a case, the predetermined volume Aw may be the product of a discharge flow rate (a volume of the coolant water forced out per unit time) of the pump 14 and a predetermine time.

(2) In the embodiments above, the cooling fluid is an antifreeze liquid called LLC based on ethylene glycol. However, various types of fluids are available as the cooling fluid.

(3) The embodiments above have described the intake air cooling device which cools intake air into the engine 12 generating running power of the vehicle. However, the present disclosure is not limited to the intake air cooling device of such a type. The present disclosure is also applicable to a broad range of intake air cooling devices cooling an intake air into various types of engines (internal combustion engines).

(4) In the embodiments above, the intercooler 15 is formed as a tank-and-tube heat exchanger. However, the intercooler 15 may be formed as a plate-stacked heat exchanger instead.

The plate-stacked heat exchanger is a heat exchanger formed by stacking multiple heat-exchanger plates of substantially a flat plate shape at intervals so as to form heat-exchanging fluid channels among the heat-exchanger plates.

What is claimed is:

1. An intake air cooling device, comprising:
a cooling fluid circuit in which a cooling fluid circulates;
a pump disposed in the cooling fluid circuit and drawing the cooling fluid into itself and discharging the cooling fluid;
an intake air cooling heat exchanger disposed in the cooling fluid circuit and including a heat-exchanging core to cool intake air into an engine by heat exchange between the intake air and the cooling fluid;
a radiator disposed in the cooling fluid circuit and cooling the cooling fluid by heat exchange between the cooling fluid and outside air; and
a microcomputer controlling at least one of the pump and a valve disposed in the cooling fluid circuit to control a flow rate of the cooling fluid supplied to the intake air cooling heat exchanger, wherein:
the heat-exchanging core includes an intake-air downstream-side core and an intake-air upstream-side core located upstream of the intake-air downstream-side core in a flow of the intake air;
each of the intake-air downstream-side core and the intake-air upstream-side core internally includes a cooling fluid channel where the cooling fluid flows;
the intake-air downstream-side core is located upstream of the intake-air upstream-side core in a flow of the cooling fluid;
the intake air cooling heat exchanger includes a U-turn portion at which a flow direction of the cooling fluid turns around between the intake-air downstream-side core and the intake-air upstream-side core; and
the microcomputer intermittently repeats multiple times a supply of a predetermined volume of the cooling fluid via the at least one of the pump and the valve to the intake air cooling heat exchanger to reach a temperature of the intake air flowing out of the intake air cooling heat exchanger repeats rise and fall cycles during a temperature of the intake air before passing through the intake air cooling heat exchanger being kept within a predetermined range or a load on the engine being kept within a predetermined range;

wherein the predetermined volume is a value determined on basis of a volumetric capacity of the cooling fluid channel in the intake-air downstream-side core.

2. The intake air cooling device according to claim 1, wherein:

the predetermined volume is from 50% to 150% of the volumetric capacity of the cooling fluid channel in the intake-air downstream-side core.

3. The intake air cooling device according to claim 1, wherein:

the microcomputer continuously controls the at least one of the pump and the valve to supply the intake air cooling heat exchanger with the cooling fluid when the temperature of the intake air before passing through the intake air cooling heat exchanger is above the predetermined range or when the load on the engine is above the predetermined range; and the microcomputer does not supply the intake air cooling heat exchanger via the at least one of the pump and the valve with the cooling fluid when the temperature of the intake air before passing through the intake air cooling heat exchanger is below the predetermined range or when the load on the engine is below the predetermined range.

4. The intake air cooling device according to claim 1, wherein:

during the temperature of the intake air before passing through the intake air cooling heat exchanger being kept within the predetermined range of the load on the engine being kept within the predetermined range, the microcomputer starts a supply of the cooling fluid to the intake air cooling heat exchanger via the at least one of the pump and the valve when a temperature of the intake air after passing through the intake air cooling heat exchanger rises above a threshold, and stops the supply of the cooling fluid to the intake air cooling heat exchanger via the at least one of the pump and the valve when an accumulated flow amount of the cooling fluid supplied to the intake air cooling heat exchanger reaches the predetermined volume.

5. The intake air cooling device according to claim 1, wherein: the volumetric capacity of the cooling fluid channel in the intake-air downstream-side core is smaller than a volumetric capacity of the cooling fluid channel in the intake-air upstream-side core.

6. The intake air cooling device according to claim 1, wherein:

the microcomputer controls a flow rate of the cooling fluid via the at least one of the pump and the valve supplied to the intake air cooling heat exchanger by controlling the pump to start and stop.

7. The intake air cooling device according to claim 6, wherein:

the pump is configured to discharge the cooling fluid at a volumetric flow rate equal to the predetermined volume per second.

8. The intake air cooling device according claim 1, wherein:

the microcomputer controls a flow rate of the cooling fluid supplied to the intake air cooling heat exchanger by opening and closing a channel of the cooling fluid via the at least one of the pump and the valve.

9. An intake air cooling device, comprising:

a cooling fluid circuit in which a cooling fluid circulates;

a pump disposed in the cooling fluid circuit and drawing the cooling fluid into itself and discharging the cooling fluid;

an intake air cooling heat exchanger disposed in the cooling fluid circuit and including a heat-exchanging core to cool intake air into an engine by heat exchange between the intake air and the cooling fluid;

a radiator disposed in the cooling fluid circuit and cooling the cooling fluid by heat exchange between the cooling fluid and outside air; and a microcomputer controlling at least one of the pump and a valve disposed in the cooling fluid circuit to control a flow rate of the cooling fluid supplied to the intake air cooling heat exchanger, wherein:

the heat-exchanging core includes an intake-air downstream-side core and an intake-air upstream-side core located upstream of the intake-air downstream-side core in a flow of the intake air;

each of the intake-air downstream-side core and the intake-air upstream-side core internally includes a cooling fluid channel where the cooling fluid flows;

the intake-air downstream-side core portion is located upstream of the intake-air upstream-side core portion in a flow of the cooling fluid;

the intake air cooling heat exchanger includes a U-turn portion at which a flow direction of the cooling fluid turns around between the intake-air downstream-side core portion and the intake-air upstream-side core portion;

the microcomputer intermittently repeats multiple times a supply of a predetermined volume of the cooling fluid via the at least one of the pump and the valve to the intake air cooling heat exchanger to reach a temperature of the intake air flowing out of the intake air cooling heat exchanger repeats rise and fall cycles during a temperature of the intake air before passing through the intake air cooling heat exchanger being kept within a predetermined range or a load on the engine being kept within a predetermined range;

the microcomputer starts a supply of the cooling fluid to the intake air cooling heat exchanger via the at least one of the pump and the valve when a temperature of the intake air after passing through the intake air cooling heat exchanger rises above a threshold; and the microcomputer stops the supply of the cooling fluid to the intake air cooling heat exchanger via the at least one of the pump and the valve when an accumulated flow amount of the cooling fluid supplied to the intake air cooling heat exchanger reaches the predetermined volume.

10. An intake air cooling device, comprising:

a cooling fluid circuit in which a cooling fluid circulates;

a pump disposed in the cooling fluid circuit and drawing the cooling fluid into itself and discharging the cooling fluid;

an intake air cooling heat exchanger disposed in the cooling fluid circuit and including a heat-exchanging core to cool intake air into an engine by heat exchange between the intake air and the cooling fluid;
a radiator disposed in the cooling fluid circuit and cooling the cooling fluid by heat exchange between the cooling fluid and outside air; and
a microcomputer controlling at least one of the pump and a valve disposed in the cooling fluid circuit to control a flow rate of the cooling fluid supplied to the intake air cooling heat exchanger, wherein:
the heat-exchanging core includes an intake-air downstream-side core and an intake-air upstream-side core located upstream of the intake-air downstream-side core in a flow of the intake air;
each of the intake-air downstream-side core and the intake-air upstream-side core internally includes a cooling fluid channel where the cooling fluid flows;
the intake-air downstream-side core is located upstream of the intake-air upstream-side core in a flow of the cooling fluid;
the intake air cooling heat exchanger includes a U-turn portion at which a flow direction of the cooling fluid turns around between the intake-air downstream-side core and the intake-air upstream-side core;
during a temperature of the intake air before passing through the intake air cooling heat exchanger being kept within a predetermined range or a load on the engine being within a predetermined range, the microcomputer
starts a supply of the cooling fluid to the intake air cooling heat exchanger via at least one of the pump and the valve when a temperature of the intake air after passing through the intake air cooling heat exchanger rises above a threshold,
stops the supply of the cooling fluid to the intake air cooling heat exchanger via the at least one of the pump and the valve when an accumulated flow amount of the cooling fluid supplied to the intake air cooling heat exchanger reaches a predetermined volume, and
does not start the supply of the cooling fluid to the intake air cooling heat exchanger via the at least one of the pump and the valve when the temperature of the intake air after passing through the intake air cooling heat exchanger decreases to or below the threshold;
wherein the predetermined volume is a value determined on basis of a volumetric capacity of the cooling fluid channel in the intake-air downstream-side core.

* * * * *